No. 12,376. REISSUED AUG. 1, 1905.

I. M. WARNER.

FENCE POST DEVICE.

APPLICATION FILED JUNE 17, 1905.

Witnesses:

Geo. E. Gayford.

Chas. H. Buell

Inventor:

Isaac M. Warner.

By Dyrenforth, Dyrenforth & Lee,

Attys.

ANDREW B. GRAHAM CO., PHOTO-LITHOGRAPHERS, WASHINGTON, D. C.

UNITED STATES PATENT OFFICE.

ISAAC M. WARNER, OF UNION CITY, MICHIGAN, ASSIGNOR TO CHARLES F. SMITH, OF DEKALB, ILLINOIS.

FENCE-POST DEVICE.

No. 12,376. Specification of Reissued Letters Patent. Reissued Aug. 1, 1905.

Original No. 769,967, dated September 13, 1904. Application for reissue filed June 17, 1905. Serial No. 265,825.

*To all whom it may concern:*

Be it known that I, ISAAC M. WARNER, a citizen of the United States, residing at Union City, in the county of Branch and State of Michigan, have invented a new and useful Improvement in Fence-Post Devices, of which the following is a specification.

The object of my invention is to provide for use with wire fences a fence-post device of novel and comparatively simple and cheap construction that will not be subject to displacement or disarrangement from heaving of the ground, which shall be adjustable for positioning it and for tightening the fence, and which shall be adapted for use as an end post or as a corner-post without requiring any bracing when applied to the last-named purpose.

Figure 1:
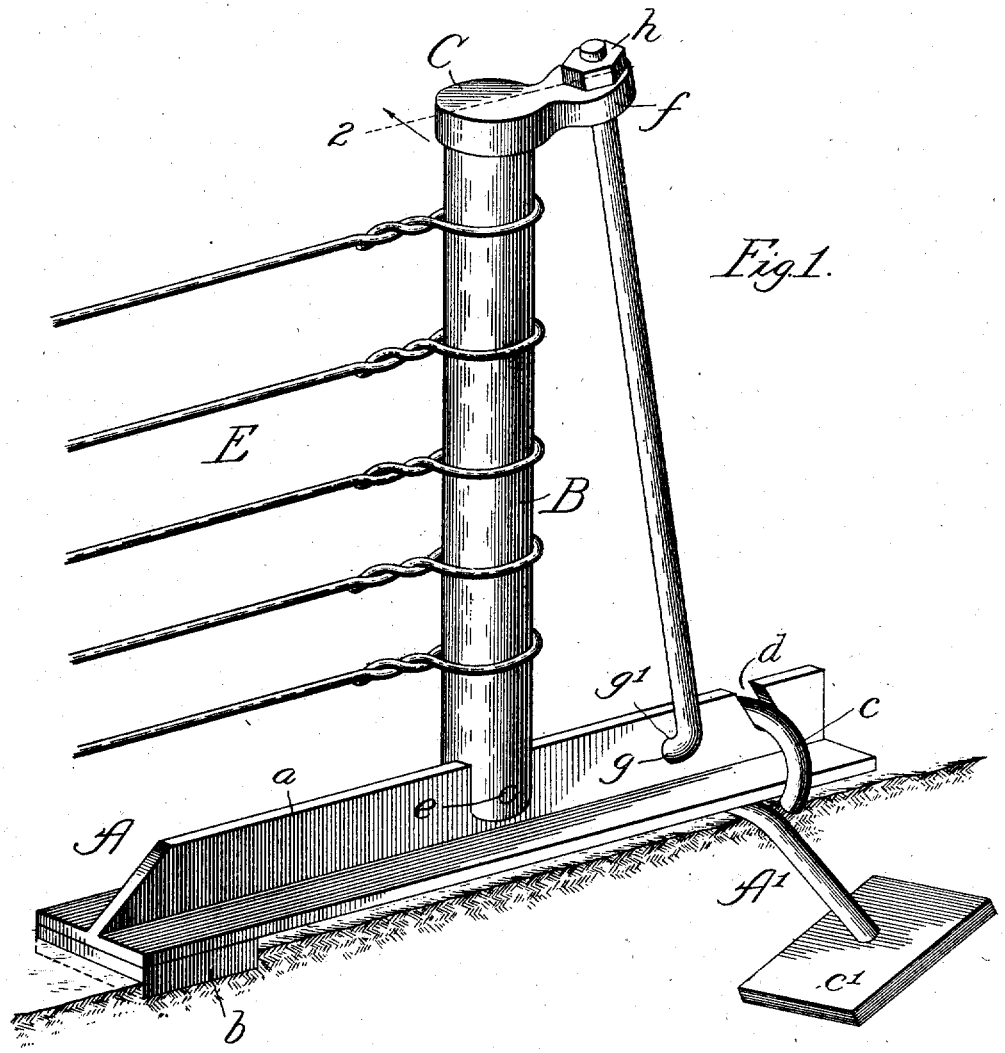
Figure 2:
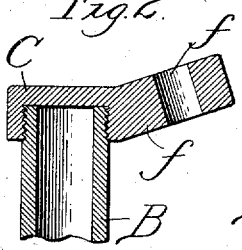

Referring to the accompanying drawings, Figure 1 shows my improved device by a perspective view in operative position, and Fig. 2 is a broken section taken at the line 2 on Fig. 1 and viewed in the direction of the arrow.

A is an elongated base composed, preferably, of a section of T-iron placed on the ground with the web *a* uppermost and with a block or bolster *b* under one end. At its opposite end the base is firmly held by an anchoring medium A′, (shown in its preferred form of a hook or loop *c*,) extending from a base-plate *c′*, buried in the ground, the hook embracing the base at a recess *d*, provided in its web.

B is the fence-post proper, which may be formed of two-inch metal tubing, bifurcated at its lower end to straddle the web *a*, to which it is pivotally fastened at *e*. The post is provided with a head C, (shown in its preferred form of a cap,) screwed upon the upper end of a post and cast with an extension *f*, projecting from it at an angle and containing an opening *f′*.

D is a rod pivotally connected at its lower end with the base A, as by forming a hook *g* on its lower end and passing the hook through an opening *g′* in the web *a*, and the upper end of the rod passes through the opening *f′* in the head and is threaded for the application to it of a nut *h*.

To apply the device, the hook *c* is buried in suitable position to the required depth in the ground, and the base A is engaged with it in the manner presented. It is preferred to bury the hook at its base-plate in the inclined position illustrated, thereby to anchor it the more securely. The base A has its bearing at the block *b*, which may sink to some extent into the ground, as represented, leaving the remainder of the base slightly above the ground-surface, although the block is not an indispensable feature of the device and the base may bear throughout on the ground. With the base thus anchored the wires of a fence E, at an end or a corner thereof, are fastened to the post B in any usual or suitable manner, and with the rod D in position a wrench is applied to the nut *h* to screw it down against the extension of the head C, thereby bringing the upper ends of the post and rod closer together, with the effect of straightening the post to position it and that of stretching the fence to take up any slack therein. While the strain of thus stretching the fence is necessarily very great upon the post, the construction of the device renders it so stable in any position to which it is adjusted as to preclude the possibility of its yielding and being thereby distorted from its adjusted position or permitting the fence to sag.

When the device is used as a corner-post, its construction renders it so rigid that braces hitherto required for supporting the post against the strain to which it is subjected are entirely dispensed with, and since the base is independent of conditions in the ground it is not subject to disturbance from the effect of frost or other causes tending to cause heaving thereof.

My invention consists in the general construction and combination of parts forming my device and is not intended to be limited to the particular details thereof shown and described, which may be variously modified by those skilled in the art without departure from the invention.

What I claim as new, and desire to secure by Letters Patent, is—

1. A fence-post device comprising, in combination, a base composed of an elongated heavy bar to rest stably on the ground, a post pivotally connected at one end with said base, a rod pivotally connected at one end with said base and adjustably connected toward its opposite end with said post beyond its pivotal connection with said base, and means for fastening the rod and post in their adjusted position.

2. A fence-post device comprising, in combination, a base composed of an elongated heavy T-bar adapted to rest at its flat side stably on the ground, a post pivotally connected at one end with the web of said base, a rod pivotally connected at one end with said web and adjustably connected toward its opposite end with said post beyond its pivotal connection with the web, and means for fastening the rod and post in their adjusted position.

3. A fence-post device comprising, in combination, a base composed of an elongated heavy bar to rest stably on the ground, an anchoring medium connected with the base and adapted to be buried in the ground, a post pivotally connected at one end with said base, a rod pivotally secured at one end to said base and adjustably connected toward its opposite end with said post beyond its connection with said base, and means for fastening the rod and post in their adjusted position.

4. A fence-post device comprising, in combination, a base composed of an elongated heavy bar to rest stably upon the surface of the ground, an anchoring medium connected with the base and adapted to be buried in the ground, a post pivotally connected at one end with said base, a head on the upper end of the post, a rod pivotally secured at its lower end and adjustably connected at its upper end with said head, and means for fastening the rod and post in their adjusted position.

5. A fence-post device comprising, in combination, a base composed of an elongated heavy bar to rest stably upon the surface of the ground, an anchoring medium connected with the base and adapted to be buried in the ground, a post pivotally connected at one end with said base, a head on the upper end of the post provided with a lateral extension, a rod pivotally secured at its lower end to said base and passing at its upper end through said extension, and a nut on the upper end of said rod.

6. A fence-post device comprising, in combination, a base composed of an elongated heavy bar to rest stably upon the surface of the ground, an anchor consisting of a hook having a plate at one end and engaging with said base near one end thereof, a post pivotally connected at one end with said base, a head on the upper end of the post provided with an extension projecting at an angle, a rod pivotally connected at its lower end to said base and passing at its upper end through said extension, and a nut on the upper end of said rod.

7. A fence-post device comprising, in combination, a base composed of a T metal bar, an anchor consisting of a hook having a plate at one end and engaging said bar near one end thereof, a post pivotally mounted on the web of said base and provided on its upper end with a head having an extension, a rod pivotally connected at its lower end with said web and passing at its upper end through said extension, and a nut on the upper end of said rod.

8. A fence-post device comprising, in combination, a base composed of a T metal bar having a block under one end, an anchor connected with the opposite end of said bar and adapted to be buried in the ground, a post pivotally mounted on the web of said base and provided on its upper end with a head having an extension projecting at an angle, a rod pivotally connected at its lower end with said web and passing at its upper end through said extension, and a nut on the upper end of said rod.

ISAAC M. WARNER.

In presence of—
JOHN A. DAY,
HAL RAFTER.